United States Patent
Jin et al.

(10) Patent No.: US 9,110,904 B2
(45) Date of Patent: Aug. 18, 2015

(54) RULE-BASED METADATA TRANSFORMATION AND AGGREGATION FOR PROGRAMS

(75) Inventors: Zhiying Jin, Lexington, MA (US); Haiyan Zhou, Winchester, MA (US); Xuefeng Yao, Waban, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 44 days.

(21) Appl. No.: 13/238,179

(22) Filed: Sep. 21, 2011

(65) Prior Publication Data

US 2013/0073574 A1 Mar. 21, 2013

(51) Int. Cl.
*G06F 17/30* (2006.01)

(52) U.S. Cl.
CPC .... *G06F 17/30038* (2013.01); *G06F 17/30563* (2013.01)

(58) Field of Classification Search
None
See application file for complete search history.

(56) References Cited

U.S. PATENT DOCUMENTS

| | | | |
|---|---|---|---|
| 7,092,567 B2 * | 8/2006 | Ma et al. | 382/177 |
| 7,185,016 B1 * | 2/2007 | Rasmussen | 1/1 |
| 7,992,085 B2 * | 8/2011 | Wang-Aryattanwanich et al. | 715/711 |
| 2004/0267737 A1 * | 12/2004 | Takazawa et al. | 707/3 |
| 2006/0271558 A1 * | 11/2006 | Makela et al. | 707/10 |
| 2007/0192300 A1 * | 8/2007 | Reuther et al. | 707/3 |
| 2007/0231781 A1 * | 10/2007 | Zimmermann et al. | 434/350 |
| 2008/0040373 A1 * | 2/2008 | Kuehmichel et al. | 707/101 |
| 2009/0083279 A1 * | 3/2009 | Hasek | 707/10 |
| 2010/0049502 A1 * | 2/2010 | Oppenheim et al. | 704/9 |
| 2010/0185637 A1 * | 7/2010 | Morris et al. | 707/758 |
| 2010/0241507 A1 * | 9/2010 | Quinn et al. | 705/14.42 |
| 2011/0161333 A1 * | 6/2011 | Langseth et al. | 707/755 |
| 2011/0289094 A1 * | 11/2011 | Fisher | 707/748 |
| 2012/0054192 A1 * | 3/2012 | Song et al. | 707/741 |

* cited by examiner

*Primary Examiner* — Bai D. Vu (57) ABSTRACT

A method and devices for obtaining metadata associated with programs from multiple metadata sources. Title metadata is compared to determine if any title metadata match. Transformation rules are applied to the title metadata when title metadata does not match with other title metadata. The transformation rules transform the title metadata into a common format. The title metadata is compared after transformation to determine whether the title metadata matches other title metadata. Title metadata that matches other title metadata, the metadata associated with a program is aggregated.

20 Claims, 9 Drawing Sheets

RULE-BASED METADATA TRANSFORMATION AND AGGREGATION FOR PROGRAMS

BACKGROUND

In today's content distribution systems, users are provided an expansive array of programs, such as videos. Given the overwhelming amount of programs available to users, service providers and/or network operators are confronted with various challenges relating to program distribution. For example, service providers and/or network operators may manage large amounts of program transfers, as well as deal with time constraints, distribution issues, resource constraints, etc., associated with a program delivery service.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "program," as used herein, may include content displayable on a television or other form of a display. A program may include, for example, a local program, a national program, a television show, a movie, an on-demand program, a pay-per-view program, a sporting event, or a news program. A program may also include Internet content. For example, a program may include a podcast, a webcast, or a video.

The term "metadata," as used herein, may include data that describes or relates to a program. For example, metadata may include a title of the program, a broadcaster, an air-time, an air-date, a program identifier (e.g., a string that identifies a program), a genre and/or a sub-genre, cast and credit details (e.g., actors, director, producer, etc.), a synopsis (e.g. plot), language, a content rating (e.g., mature, children, PG-13, etc.), a program format (e.g., standard definition, high-definition, 3-D, etc.), a year of release, preview, a trailer, a photo, award information, a review of a program, and a biography associated with cast and/or crew members.

Figure 1:
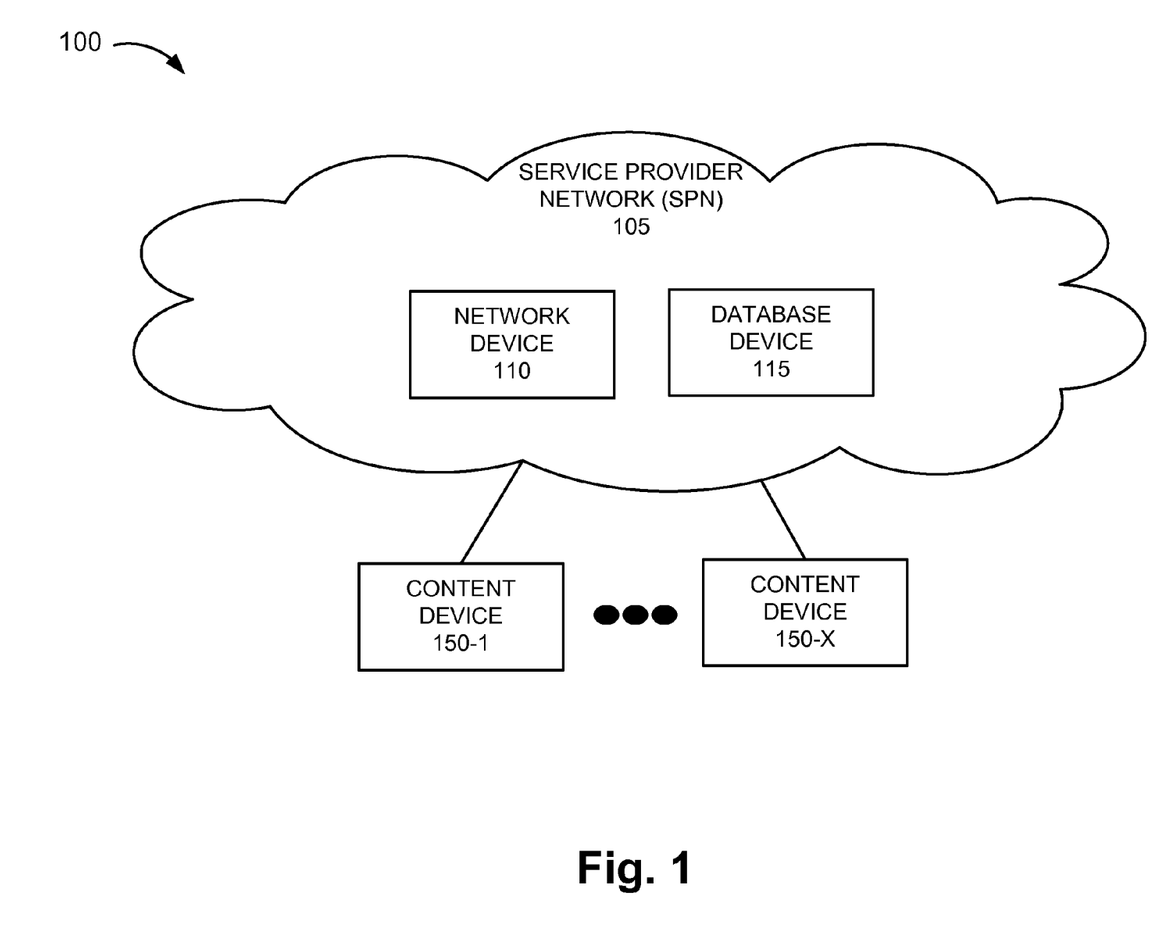
FIG. 1 is a diagram illustrating an exemplary environment in which an exemplary embodiment of rule-based metadata transformation and aggregation may be implemented.

FIG. 1 is a diagram illustrating an exemplary environment in which an exemplary embodiment of rule-based metadata transformation and aggregation of metadata may be implemented. As illustrated, environment 100 includes a service provider network (SPN) 105 that includes, among other devices, a network device 110 and a database device 115. Environment 100 also includes content devices 150-1 to 150-X, in which X>1 (referred to collectively as content devices 150 and individually as content device 150).

The number of devices and networks, and the configuration in environment 100 are exemplary and provided for simplicity. According to other embodiments, environment 100 may include additional devices, fewer devices, different devices, and/or differently arranged devices, than those illustrated in FIG. 1.

According to other embodiments, a single device in FIG. 1 may be implemented as multiple devices and/or multiple devices may be implemented as a single device. A device may be implemented according to a centralized computing architecture or a distributed computing architecture. Additionally, a device may be implemented according to one or multiple network architectures (e.g., a client device, a server device, a peer device, or a combination thereof).

Additionally, or alternatively, environment 100 may include additional networks and/or differently arranged networks, than those illustrated in FIG. 1. For example, environment 100 may include other types of network(s), such as a network provider network, a content provider network, the Internet, etc. Also, according to other embodiments, one or more functions and/or processes described as being performed by a particular device may be performed by a different device, or some combination of devices. Environment 100 may be implemented to include wired and/or wireless connections among the devices illustrated.

Service provider network 105 includes a network that provides access to programs to users. For example, service provider network 105 may include a program delivery network. The program delivery network may provide at least one of a television service, a mobile service, or an Internet service. Service provider network 105 may correspond to a satellite-based network and/or a terrestrial-based network. Although not illustrated, service provider network 105 may include, for example, billing devices, application servers, security devices, routing devices, etc.

Network device 110 includes one or multiple network devices that provide rule-based metadata transformation and aggregation, as described herein. Network device 110 may take the form of a computational device (e.g., a computer), a server (e.g., a Web server, an application server) a data management device (e.g., a database management system), or other suitable network device. Database device 115 includes one or multiple devices that store(s) metadata. Database device 115 may take the form of a computational device (e.g., a computer), a server (e.g., an application server, etc.), or other suitable network device. Database device 115 may include a repository or mass storage device to store metadata.

Content devices 150 include devices that provide metadata. For example, each content device 150 may be associated with a particular vendor of metadata pertaining to programs. The type or kind of metadata may vary between vendors. For example, one vendor may provide metadata for television guides, another vendor may provide metadata for video-on-demand programs, and yet another vendor may provide metadata for television shows (e.g., episodes) or chapter information for DVDs or Blu-Ray® discs. Content devices 150 may take the form of computational device (e.g., a computer), a server (e.g., an application server, etc.), or other suitable network device. Content devices 150 may include repositories or mass storage devices to store the metadata.

According to an exemplary embodiment, a network device (e.g., network device 110) transforms metadata from one format into a common format. According to an exemplary embodiment, the metadata transformed includes the title associated with a program. In this way, metadata received from content devices 150 of different vendors may share a common link based on the common format. By way of example, assume that content device 150-1 provides metadata pertaining to the program entitled "Star Trek VIII: First Contact," and content device 150-X provide metadata pertaining to the program entitled "Star Trek 8: First Contact." While both sets of metadata pertain to the same program, the titles are different. In this example, the network device may transform the title "Star Trek VIII: First Contact" to "Star Trek: First Contact" and transform the title "Star Trek 8: First Contact" to "Star Trek: First Contact." According to another example, the programs may not be exactly the same, but substantially similar so that metadata is applicable to both programs. For example, metadata pertaining to the program entitled "Star Trek 8: First Contact" and metadata pertaining to the program "Star Trek 8: First Contact—Director's Edition" may be the same. In this example, the network device may transform these titles to "Star Trek: First Contact."

The transformed metadata may form a basis for linking metadata from content device 150-1 and content device 150-X. For example, assume content device 150-1 provides metadata pertaining to the title, the cast, the crew, and the plot. Additionally, content device 150-X provides metadata pertaining to the title, a trailer, and biographies of the cast. The network device may link types of metadata (e.g., crew metadata, cast metadata, trailer metadata, etc.) of a program, originating from different sources (e.g., vendors), based on the transformed metadata (e.g., title metadata). According to an exemplary embodiment, the network device transforms metadata based on transformation rules, which are described further below.

According to an exemplary embodiment, the network device selects and aggregates metadata based on a shared metadata link. For example, the network device may select metadata provided by content device 150-1 and select metadata provided by content device 150-X that pertain to a program. The aggregated metadata may then be included in various user interfaces. By way of example, an interactive programming guide (IPG) provided with a television service, a mobile service, and/or an Internet service may use the aggregated metadata. Additionally, for example, the aggregated metadata may be included in various other user interfaces, such as, a video-on-demand user interface, a pay-per-view user interface, a search and browse user interfaces, etc. The user interfaces are provided to the users and viewed via various types of user devices.

Figure 2:
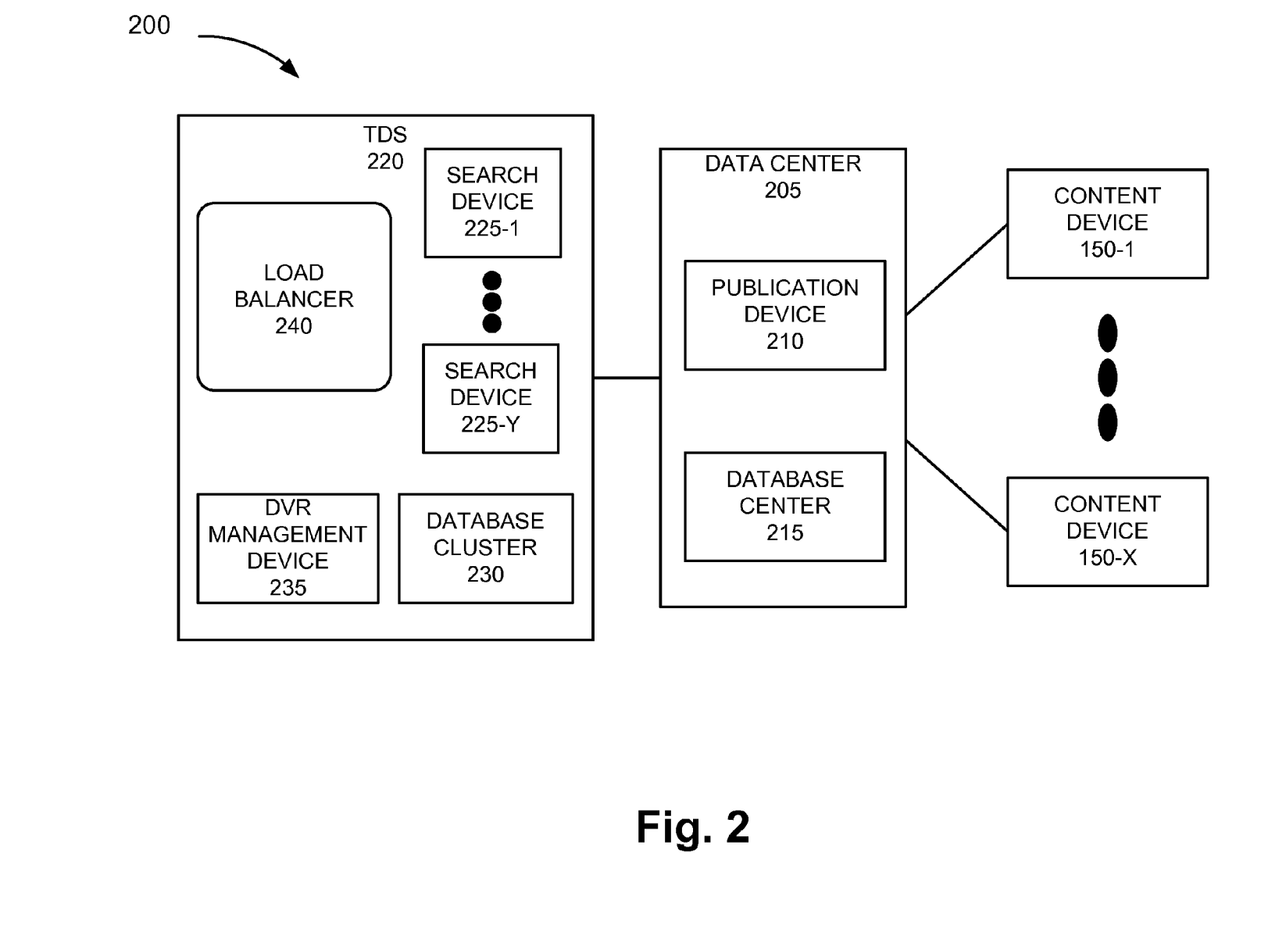
FIG. 2 is a diagram illustrating another exemplary environment in which an exemplary embodiment of rule-based metadata transformation and aggregation may be implemented.

FIG. 2 is a diagram illustrating another exemplary environment in which an exemplary embodiment of rule-based metadata transformation and aggregation of metadata may be implemented. As illustrated, environment 200 includes a data center 205 and a television distribution site (TDS) 220. Environment 200 also includes content devices 150.

Data center 205 corresponds to a television distribution site that receives and manages programs and metadata. As illustrated, data center 205 includes exemplary television distribution devices, such as, for example, a publication device 210 and a database center 215.

Publication device 210 includes one or multiple devices that publish, push, or make available programs and metadata stored in database center 215. For example, publication device 210 publishes, pushes, or makes available programs and metadata pertaining to the programs to television distribution site 220. Publication device 210 may take the form of a computational device (e.g., a computer), a server (e.g., an application device, etc.), or other suitable network device.

Database center 215 includes devices that store programs and metadata. For example, database center 215 receives and stores programs and metadata from content devices 150. Database center 215 includes a device that transforms metadata based on transformation rules. Database center 215 includes a device for aggregating metadata.

Television distribution site 220 corresponds to a program distribution site that, among other things, distributes programs to users. As illustrated, television distribution site 220 includes exemplary television distribution devices, such as, for example, search devices 225-1 to 225-Y (referred to collectively as search devices 225 and individually as search device 225), and a database cluster 230, a DVR management device 235, and a load balancer 240.

Search devices 225 may include devices that provide programs to users. Database cluster 230 may include a device that stores various types of data, such as, for example, an interactive programming guide, set top box configuration data, and/or user profile data. DVR management device 235 may include a device that manages the recording of programs among users' digital video recorders (DVRs). Load balancer 240 may include a device that manages a load (e.g., the provisioning and delivering of programs to users) among search servers 225. For example, load balancer 240 may equally distribute the processing load associated with delivering programs to search devices 225.

Figure 3A:
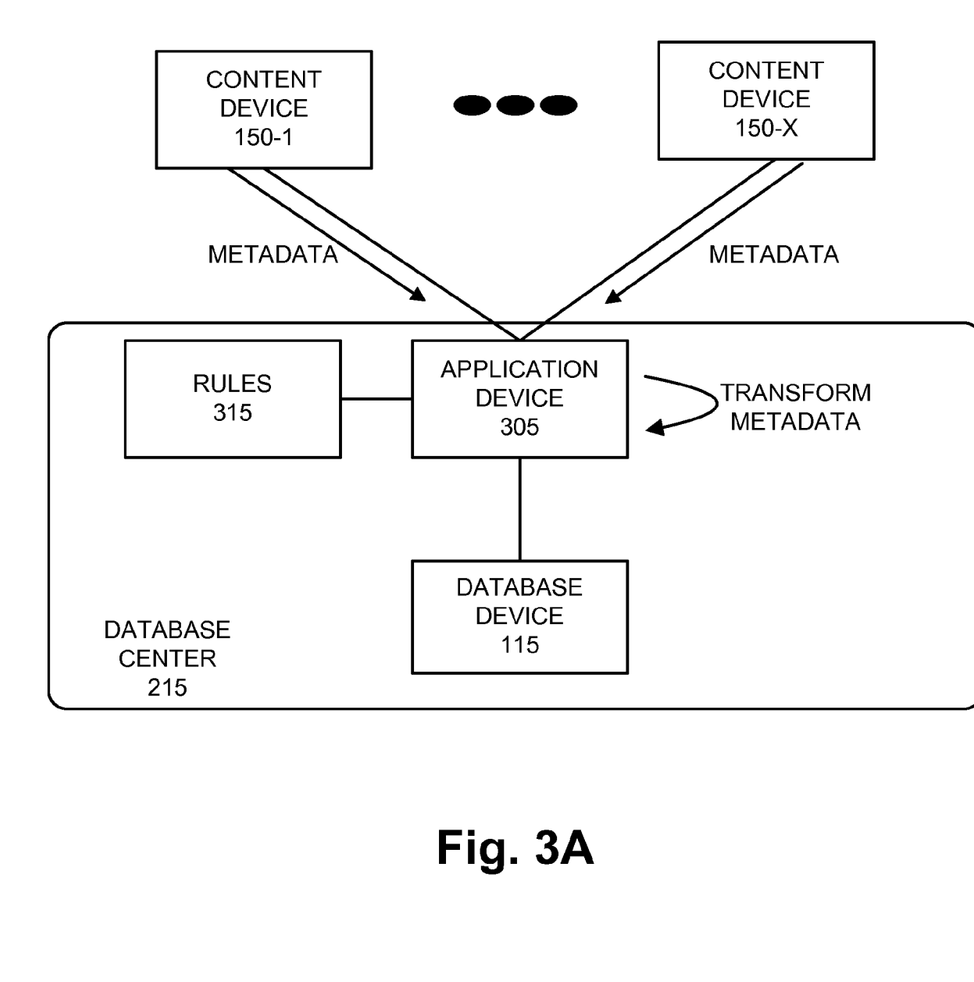
FIG. 3A is a diagram illustrating an exemplary process for transforming metadata.

FIG. 3A is a diagram illustrating an exemplary process for transforming metadata. As illustrated, database center 215 includes an application device 305. Application device 305 includes a device that transforms metadata based on rules 315. Rules 315 include an algorithm for transforming metadata, as described further below. Application device 305 may take the form of a computational device (e.g., a computer), a server (e.g., an application server), a gateway, or other suitable network device.

Referring to FIG. 3A, application device 305 obtains metadata from content devices 150. Application device 305 may also obtain programs from content devices 150. According to an exemplary embodiment, metadata from different sources (e.g., content devices 150) may be linked based on a common format of a particular type of metadata. According to an exemplary implementation, the particular type of metadata is the title of a program. According to another exemplary implementation, the particular type of metadata may include other types of metadata, such as the director and/or one or more of the cast members.

According to an exemplary embodiment, application device 305 identifies which program titles match. For example, two or more content devices 150 may provide metadata that includes the same title. As an example, two or more content devices 150 may provide metadata for a movie in which the title (e.g., "Wedding Crashers") is an exact match. Application device 305 stores the metadata associated with this movie in database device 115. When titles do not match, application device 305 applies rules 315 to the titles so that titles (e.g., associated with the same program) match.

Described below are examples of transformation rules included in rules 315. The transformation rules described and the examples of each rule are not intended to be exhaustive. Additionally, some rules may be more applicable to particular types of programs than others. As an example, some rules may apply to television programs while other rules may apply to movies because of the type of words included in the program title. As an example, a title that includes the word "season" is typically directed to a television show versus a movie. In this regard, a rule may be directed to a particular word occurrence and, in turn, applicable to a particular type of program.

As described below, the transformation rules are described in terms of performing a particular function, such as, expanding, removing, moving, splitting, replacing, etc. These operations may be performed based on various types of sub-functions, such as, string recognition, string matching, string parsing, string-order recognition, string deletion, string addition, string saving, etc. A string may correspond to a letter, a number, a word, etc. According to an exemplary implementation, the transformation rules may also use a library that includes strings. These strings may be used, for example, to perform string matching and string addition.

A first rule includes expanding an abbreviation of a word in a program title. For example, an abbreviation of the words "season" and "episode" in a program title may be expanded. For example, metadata that includes a title, such as, "One Tree Hill S8E15," in which the "S" represents "season" and "E" represents "episode" may be transformed (e.g., expanded) to "One Tree Hill Season 8, Episode 15." A second rule includes the removing of a rating in a program title. For example, words such as "unrated," "uncensored," "unapologetic," etc. may be removed. By way of example, metadata that includes a title, such as "Wedding Crashers (Unrated)" may be transformed (e.g., remove word(s)) to "Wedding Crashers" or metadata that includes a title, such as "Road Trip—Beer Pong Unrated Edition" may be transformed to "Road Trip—Beer Pong."

A third rule includes the removing of time information from a program title. For example, time information may include a year. By way of example, metadata that includes a title, such as, "Nothing But Trouble (1991)," may be transformed to "Nothing But Trouble."

A fourth rule includes the moving or re-arranging of articles (e.g., a, an, the, etc.) included in a program title to a beginning of a program title. For example, metadata that includes a title, such as, "Hangman, The" may be transformed to "The Hangman." According to the fourth rule and this example, punctuation (e.g., a comma, etc.) may be removed. According to another example, metadata that includes a title, such as, "American Haunting, An" may be transformed to "An American Haunting," or metadata that includes a title, such as "Mighty Heart, A," may be transformed to "A Mighty Heart."

A fifth rule includes removing words from a split title. For example, metadata that includes a title, such as "After Dark: Fertile Ground" may be transformed to "Fertile Ground." According to another example, metadata that includes a title, such as "Sex and the City: The Movie" may be transformed to "Sex and the City." According to these examples, punctuation (e.g., a colon, etc.) may be removed.

A sixth rule includes replacing a number with a word corresponding to the number. For example, metadata that includes a title, such as "Jennifer 8" may be transformed to "Jennifer Eight." In this example, the number does not correspond to a sequel number or other tag to the main title. In this regard, the replace function is able to distinguish between the occurrence of a number that is a part of the main title versus a sequel number, etc.

A seventh rule includes replacing the word "and" or the letter "N" with an ampersand, "&." For example, metadata that include a title, such as "Batman N Robin" may be transformed to "Batman & Robin." According to another example, metadata that includes a title, such as "Rudolph and Frosty's Christmas In July," may be transformed to "Rudolph & Frosty's Christmas In July."

An eighth rule includes replacing or removing a Roman numeral. For example, metadata that includes a title, such as "Psycho II," may be transformed to "Psycho 2." In this example, the Roman numerals "II" are replaced with the number "2." According to another example, metadata that includes a title, such as Star Trek VIII: First Contact," may be transformed to "Star Trek: First Contact." In this example, the Roman numerals "VIII" are removed.

A ninth rule includes removing articles (e.g., "a," "an," "the," etc.). For example, metadata that includes a title, such as "The Lord of the Rings: The Return of the King," may be transformed to "Lord of the Rings: The Return of the King." In this example, "Lord of the Rings" is the more popular referent for the movie. In this regard, the remove function is able to distinguish between necessary and superfluous articles.

A tenth rule includes removing special characters. For example, metadata that includes a title, such as "Fired Up!," may be transformed to "Fired Up." According to another example, metadata that includes a title, such as "S.W.A.T. Firefight," may be transformed to "SWAT: Firefight."

An eleventh rule includes removing a space. For example, metadata that includes a title, such as "Death Wish," may be transformed to "Deathwish." A twelfth rule includes removing a name from the title. For example, metadata that includes a title, such as "John Grisham's The Rainmaker," may be transformed to "The Rainmaker." According to another example, metadata that includes a title, such as "Jackie Chan's The Myth," may be transformed to "The Myth." In this example, there is a common pattern. That is, in the exemplary titles described above, each title follows the pattern of: someone's XXXX. In these cases, the "someone" corresponds to a person, such as a director, an actor, a producer, or an author of the program. The "XXXX" may correspond to a main portion of the title.

A thirteenth rule includes replacing accented letters with unaccented letters. For example, metadata that includes a title, such as "Æon Flux," may be transformed to "Aeon Flux." A fourteenth rule includes removing edition information from a title. For example, metadata that includes a title, such as "Star Trek I: The Motion Picture—The Director's Edition," may be transformed to "Star Trek: The Motion Picture."

While the exemplary transformation rules pertain to titles, rules 315 include other rules for other types of metadata. For example, metadata pertaining to cast information and crew information may be transformed. By way of example, when names of a cast member or a crew member associated with a program do not match, application device 305 may use certain rules to transform this type of metadata. For example, a first rule includes ignoring certain parts of a name, such as a middle name, a middle initial, a suffix, or a prefix. For example, metadata that includes a name, such as "Samuel L. Jackson," may be transformed to "Samuel Jackson." According to another example, metadata that includes a name, such as "Robert Downey Jr.," may be transformed to "Robert Downey."

A second rule includes reversing an order of a first name and a last name. For example, metadata pertaining to foreign names may have a first name and a last name reversed. For example, metadata that includes a name, such as "Zhang Ziyi," may be transformed to "Ziyi Zhang."

A third rule includes replacing a name that includes an accent or a special marking with a corresponding name without an accent or a special marking. For example, metadata that includes a name, such as "Jean-Francois Richet," may be transformed to "Jean-Francois Richet."

According to an exemplary embodiment, after the transformation rules are applied to the metadata that did not initially match, application device 305 may compare the titles to identify titles that match. Application device 305 stores the metadata in database 115 including metadata associated with titles that match. As described below, application device 305 performs an aggregation process to the metadata stored by database device 115.

Figure 3B:
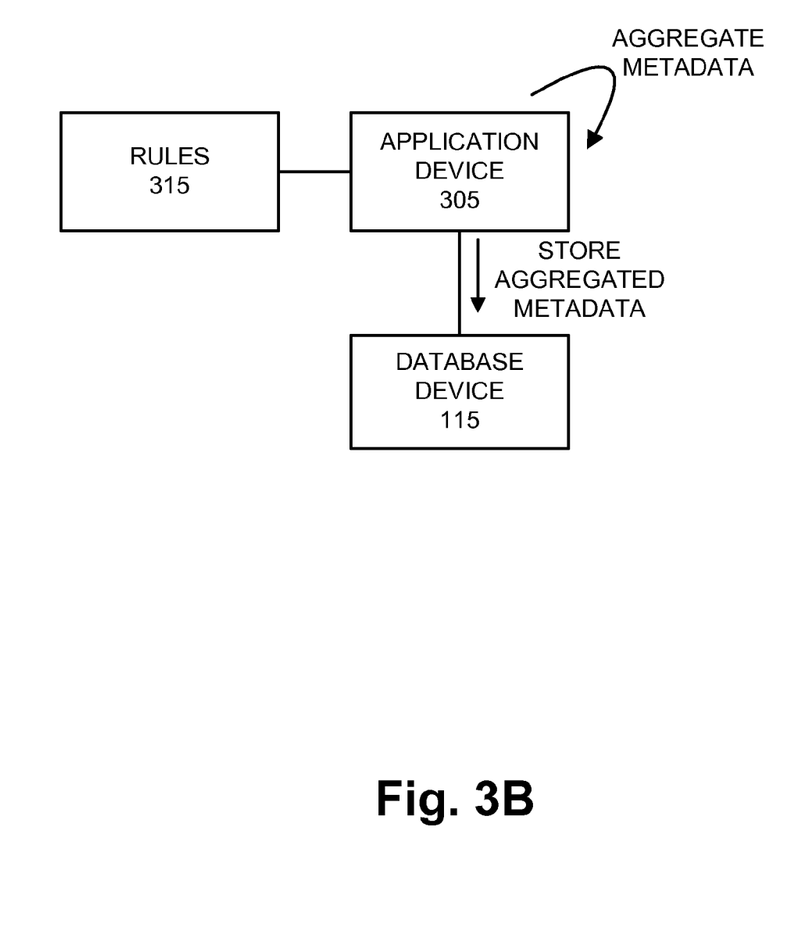
FIG. 3B is a diagram illustrating an exemplary process for aggregating metadata.

FIG. 3B is a diagram illustrating an exemplary process for aggregating metadata. As illustrated, application device 305 aggregates the metadata and stores the aggregated metadata in database device 115. The process of aggregation includes selecting different types of metadata (e.g., cast, crew, plot, etc.) from the different sources of metadata so that the most complete collection of metadata may be obtained pertaining to a program. By way of example, if one metadata source (e.g., content device 150-1) includes metadata pertaining to the cast, but does not include images of the cast, and another metadata source (e.g., content device 150-X) includes metadata having images of the cast, application device 305 aggregates these two different types of metadata.

In some instances, application device 305 may obtain redundant metadata from different metadata sources. For example, content device 150-1 may provide plot metadata and content device 150-X may provide plot metadata. According to an exemplary embodiment, application device 305 selects the metadata deemed as providing the better plot metadata based on one or more quality metrics. According to an exemplary implementation, application device 305 may perform a comparative count of words between the two different plot metadata. Application device 305 selects the plot metadata that includes a greater number of words. In the case of a tie, application device 305 selects the plot metadata having a greater number of letters.

According to another implementation, application device 305 may perform a semantic interpretation of the plot metadata based on conventional techniques. Application device 305 may create a new plot metadata based on a combination of the plot metadata from content devices 150-1 and 150-X. For example, application device 305 may select aspects of the plot described in a first plot metadata that is not discussed in a second plot metadata and select aspects of the plot described in the second plot metadata that is not discussed in the first plot metadata.

Figure 3C:
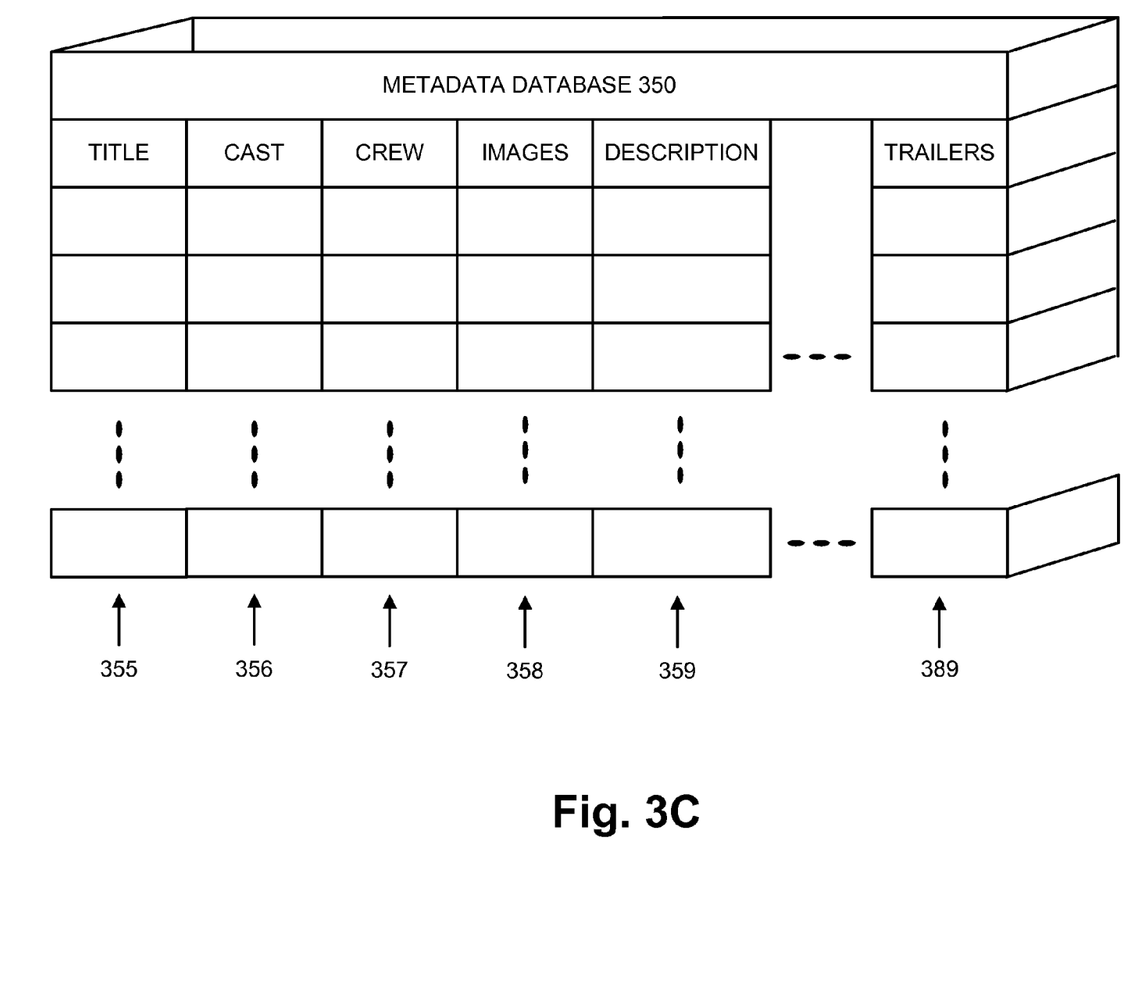
FIG. 3C is a diagram illustrating an exemplary metadata database.

FIG. 3C is a diagram illustrating an exemplary metadata database. As previously described, application device 305 stores the aggregated metadata in a database, such as a metadata database 350. As illustrated, metadata database 350 includes different fields of metadata, such as a title field 355 that includes the title of a program, a cast field 356 that includes cast information (e.g., names of actors/actresses), a crew field 357 that includes crew information such as names of persons and their titles or positions (e.g., director—Quentin Tarantino, etc.), an images field 358 that includes images pertaining to a program, a description field 359 that includes a synopsis or the plot of a program, a trailers field 389 that includes metadata pertaining to a trailer(s) for a program, as well as other types of metadata. The different types of metadata illustrated in FIG. 3C and described herein are not intended to be exhaustive. According to other implementations, metadata database 350 may include additional metadata fields, different metadata fields, and fewer metadata fields. For example, depending on the type of program, the metadata stored in metadata database 350 for a program may be different. By way of example, when a program is a movie, the aggregated metadata may include different types of metadata than when a program is a television show.

Figure 3D:
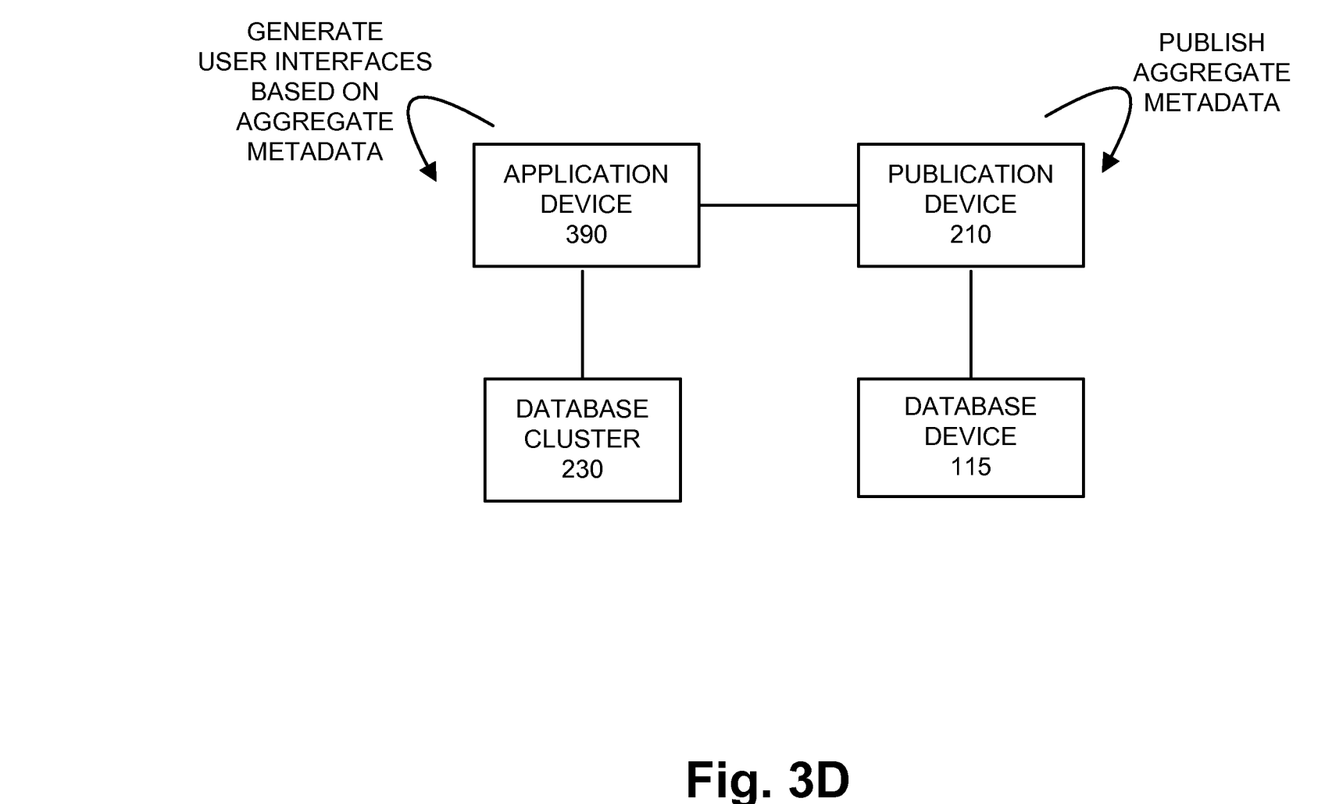
FIG. 3D is a diagram illustrating an exemplary process for generating user interfaces based on aggregated metadata.

FIG. 3D is a diagram illustrating an exemplary process for generating user interfaces based on aggregated metadata. As illustrated in FIG. 3D, the aggregated metadata stored in metadata database 350 by database device 115 is published or made available to other network devices. For example, publication device 210 publishes the aggregated metadata to television distribution site 220 that includes an application device 390.

Application device 390 includes a network device that generates user interfaces based on the aggregated metadata. By way of example, a user interface may conform to a particular template. The generation of the user interface may include using the aggregated metadata to fill certain areas of a user interface. In this example, the user interfaces generated may be applicable to a television service. However, according to other embodiments, publication device 210 or other devices (not illustrated) may be used to acquire the aggregated metadata to generate user interfaces for a mobile service and an Internet service in which program access and program delivery are provided. Application device 390 may take the form of a computational device (e.g., a computer), a server (e.g., an application server, etc.), or some other suitable network device.

There are various types of user interfaces that may include the aggregated metadata. For example, when a user navigates to an interactive programming guide, the interactive programming guide may include aggregated metadata, such as a title of the program. In the case of a movie, the metadata may also include cast information and a plot summary, as well as other types of metadata (e.g., year of the movie, etc.). Additionally, when a user navigates to various screens (e.g., via a menu), the user may be presented with various types of metadata pertaining to a program. For example, when a user navigates to pay-per-program screens and video-on-demand screens, the user may view various types of metadata pertaining to the program of interest.

Figure 4:
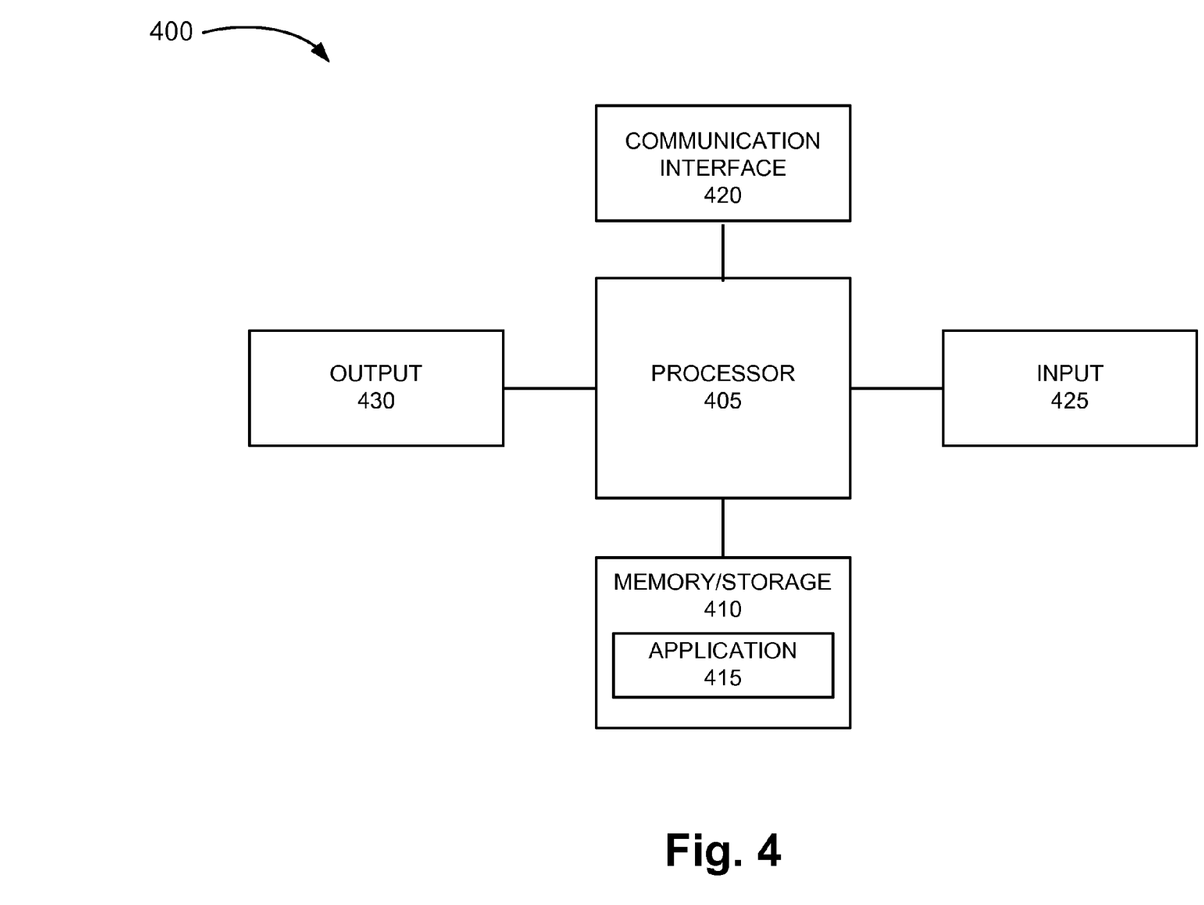
FIG. 4 is a diagram illustrating exemplary components of a device that may correspond to one or more of the devices in the environments depicted in FIGS. 1 and 2.

FIG. 4 is a diagram illustrating exemplary components of a device 200 that may correspond to one or more of the devices in environments 100 and 200. As illustrated, according to an exemplary embodiment, device 200 may include a processor 405, memory/storage 410 including an application 415, a communication interface 420, an input 425, and an output 430. According to other embodiments, device 200 may include fewer components, additional components, different components, and/or a different arrangement of components than those illustrated in FIG. 4 and described herein.

Processor 405 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 210), etc.

Processor 405 may control the overall operation or a portion of operation(s) performed by device 400. Processor 405 may perform one or multiple operations based on an operating system and/or various applications (e.g., application 415). Processor 405 may access instructions from memory/storage 410, from other components of device 400, and/or from a source external to device 400 (e.g., a network, another device, etc.).

Memory/storage 410 may include one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, application(s), and/or instructions related to the operation of device 400.

Application 415 may include software or a program that provides various services and/or functions. For example, with reference to network device 110 or application device 305 and according to an exemplary embodiment, application 415 may include one or multiple applications or programs (e.g., a metadata transform application, a metadata aggregation application) that provide rule-based metadata transformation and aggregation, as described herein.

Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing instructions (e.g., application 415) stored by memory/storage 410. By way of example, the instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.), the execution of firmware with hardware, or the execution of software and firmware with hardware.

Figure 5A:
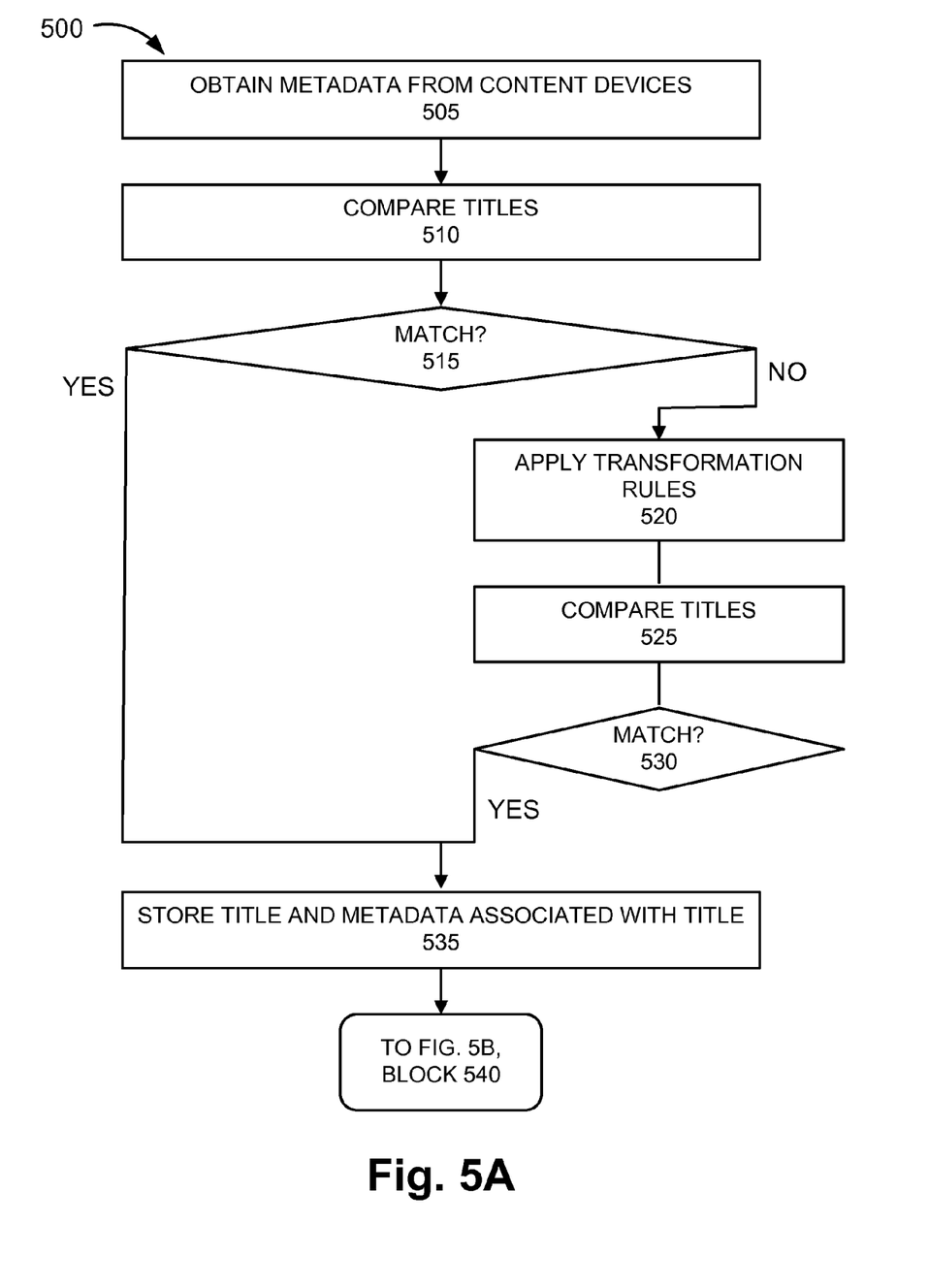
FIGS. 5A and 5B are flow diagrams illustrating an exemplary process for transforming metadata based on transformation rules and the aggregation of metadata.
Figure 5B:
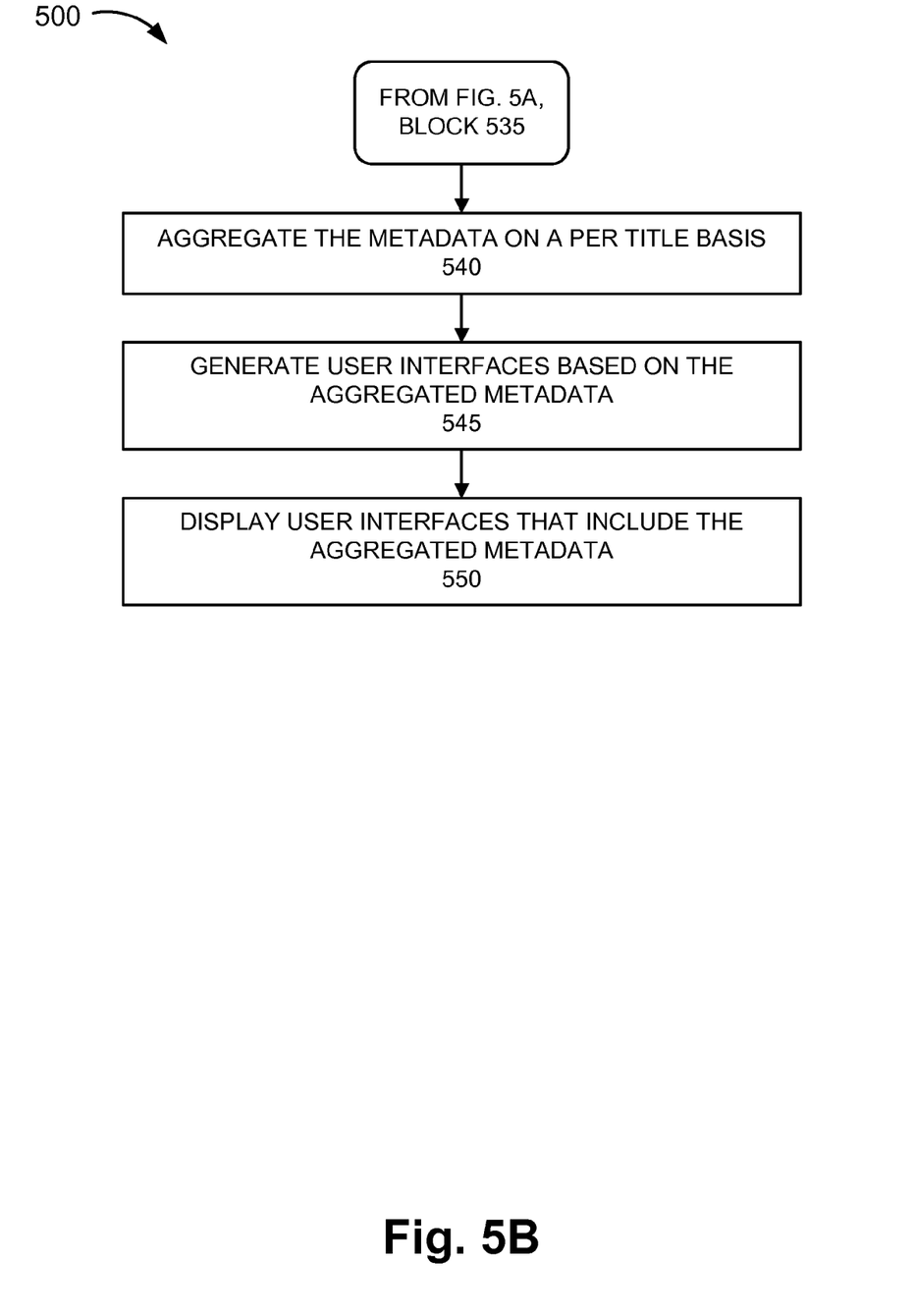

FIGS. 5A and 5B are flow diagrams illustrating an exemplary process 500 for transforming metadata based on transformation rules, aggregating the metadata, and generating user interfaces based on the aggregated metadata. According to an exemplary embodiment, network device 110 or application device 305 may perform one or more of the steps described in process 500. For example, processor 405 may execute an application 415 to perform the steps described.

Referring to FIG. 5A, in block 505, metadata from devices is obtained. For example, application device 305 receives metadata from content devices 150. The metadata pertains to various types of programs. Additionally, the type of metadata received may vary among content devices 150.

In block 510, the titles of programs are compared. For example, application device 305 compares title metadata associated with programs to identify whether two or more titles match.

In block 515, it is determined whether two or more titles match. For example, based on the comparison of title metadata, application device 305 identifies whether two or more titles match. If two of more titles match (block 515—YES), then application device 305 stores the title metadata and other metadata associated with the title metadata in database device 115 (block 535). If two or more titles do not match (block 515—NO), then application device 305 transforms the title metadata based on rules 315 (block 520).

In block 525, the titles of programs are compared after transformation. For example, as previously described in block 510, application device 305 compares title metadata to identify whether two or more titles match. In block 530, it is determined whether two or more titles match. For example, application device 305 identifies whether two or more titles match. In this example, it may be assumed that the title metadata that did not initially match in block 515 now matches. Thus, as illustrated in block 530, if two or more titles match (block 530—YES), then application device 305 stores the title metadata and other metadata associated with the title metadata in database device 115 (block 535). In some cases, there may be instances when title metadata does not match. For example, when metadata pertaining to a program comes from one metadata source.

Referring to FIG. 5B, in block 540, the metadata is aggregated on a per title basis. For example, application device 305 aggregates the metadata associated with the title and stores the aggregated metadata in metadata database 350.

In block 545, the aggregated metadata is used to generate user interfaces. For example, application device 390 generates user interfaces based on the aggregated metadata.

In block 550, the user interfaces that include the aggregated metadata are displayed to users. For example, service provider network 105 provides the user interfaces to user devices, which are displayed to the users.

Although FIGS. 5A and 5B illustrate an exemplary process 500 for transforming metadata, aggregating metadata, and generating user interfaces based on the aggregated metadata, according to other embodiments, process 500 may include additional operations, fewer operations, and/or different operations than those illustrated in FIGS. 5A and 5B and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/ or" is intended to be interpreted to include any and all combinations of one or more of the associated items.

In addition, while series of blocks has been described with regard to the process illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 205, etc.), a combination of hardware and software (e.g., application 215), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   obtaining, by a device, metadata pertaining to programs originating from multiple metadata sources;
   comparing, by the device, metadata of a first type from one of the metadata sources with one or more metadata of the first type from one or more others of the metadata sources;
   determining, by the device, whether compared metadata of the first type from the one of the metadata sources matches the one or more metadata of the first type from the one or more others of the metadata sources based on the comparing;
   transforming, by the device, the compared metadata based on one or more transformation rules when the compared metadata does not match;
   storing, by the device, transformed metadata, wherein the transformed metadata of the first type from the one of the metadata sources matches at least one of the one or more metadata of the first type from at least one other of the metadata sources;
   aggregating one or more other types of metadata associated with the transformed metadata with one or more other types of metadata associated with the at least one of the one or more others of the metadata sources, wherein the aggregating comprises:
      identifying when metadata of a same metadata type is obtained from the one of the metadata sources and the one or more others of the metadata sources, wherein the metadata of the same metadata type is other than title metadata;
      determining which metadata of the same metadata type to aggregate based on a quality metric that indicates a quality of each metadata; and
      selecting metadata of the same metadata type from the one of the metadata sources or the one or more others of the metadata sources based on the determining, wherein the determining which metadata of the same metadata type to aggregate based on the quality metric comprising:
   counting a number of words in the metadata of the same metadata type from the one of the metadata sources;
   counting a number of words in the metadata of the same metadata type from the one or more others of the metadata sources; and
   determining whether the number of words in the metadata of the same metadata type from the one of the metadata sources is greater than the number of words in the metadata of the same metadata type from the one or more others of the metadata sources; and wherein the selecting comprises:
   selecting the metadata of the same metadata type from the one of the metadata sources or from the one or more others of the metadata sources in response to the determining that the number of words in the metadata of the same metadata type from the one of the metadata sources or from the one or more others of the metadata sources is greater.

2. The method of claim 1, further comprising:
   storing transformation rules, wherein the transformation rules include functions that include expanding, removing, moving, splitting, and replacing at least one of one or more letters, one or more numbers, one or more roman numerals, or one or more words included in the type of metadata, and the transforming comprises:
   transforming the compared metadata based on one or more of the functions.

3. The method of claim 1, wherein the metadata of the first type includes a title of a program, and the method further comprising:
   aggregating one or more other types of metadata associated with the transformed metadata with one or more other types of metadata associated with the one or more others of the metadata sources, wherein the aggregating comprises:
   identifying a metadata type obtained from the one of the metadata sources that is not included in metadata obtained from the one or more others of the metadata sources;
   identifying another metadata type obtained from the one or more others of the metadata sources that is not included in metadata obtained from the one of the metadata sources; and
   combining metadata of the metadata type with metadata of the other metadata type, wherein a combined metadata includes aggregated metadata.

4. The method of claim 3, further comprising:
   publishing the aggregated metadata;
   generating user interfaces that include the aggregated metadata, wherein the user interfaces are a part of at least one of a television service, a mobile service, or an Internet service that includes a delivery of the programs; and
providing generated user interfaces to users via user devices.

5. The method of claim 1,
wherein the metadata of the first type comprises a title of a program.

6. The method of claim 5, further comprising:
storing the transformation rules;
selecting the one or more of the transformation rules to use to transform the compared metadata when the compared metadata does not match;
determining that the number of words in the metadata of the same metadata type from the one of the metadata sources is equal to the number of words in the metadata of the same metadata type from the at least one other of the metadata sources;
counting a number of letters in the metadata of the same metadata type from the one of the metadata sources;
counting a number of letters in the metadata of the same metadata type from the at least one other of the metadata sources;
determining whether the number of letters in the metadata of the same metadata type from the one of the metadata sources is greater than the number of letters in the metadata of the same metadata type from the at least one other of the metadata sources; and wherein the selecting comprises:
selecting the metadata of the same metadata type from the one of the metadata sources or from the at least one other of the metadata sources in response to the determining that the number of letters in the metadata of the same metadata type from the one of the metadata sources or from the at least one other of the metadata sources is greater.

7. The method of claim 1, further comprising:
storing transformation rules pertaining to titles of programs, wherein the metadata of the first type includes a title of a program and wherein the transformation rules include:
a first rule that expands an abbreviation of a word to a full word;
a second rule that removes a rating included in a title;
a third rule that removes a year from a title;
a fourth rule that moves articles to a beginning of a title;
a fifth rule that removes one or more words from a split title;
a sixth rule that replaces a number with a corresponding word for the number;
a seventh rule that replaces a letter or a word with an ampersand; and
an eighth rule replaces a roman numeral with a corresponding number.

8. The method of claim 1, further comprising:
storing transformation rules pertaining to titles of programs, wherein the metadata of the first type includes a title of a program and wherein the transformation rules include:
a first rule that removes an article from a title;
a second rule that removes a special character from a title;
a third rule that removes a space in a title;
a fourth rule that removes a person's name from a title;
a fifth rule that replaces an accented letter in a title with an unaccented letter; and
a sixth rule that removes edition information from a title.

9. The method of claim 1, further comprising:
transforming another type of metadata based on one or more transformation rules, wherein the other type of metadata pertains to cast information or crew information associated with a program;
comparing metadata of a second type obtained from the one of the metadata sources with one or more metadata of the second type obtained from the one or more others of the metadata sources;
determining whether the metadata of the second type matches the one or more metadata of the second type; and
aggregating a portion of the metadata of the second type with a portion of the one or more metadata of the second type in response to determining that the metadata of the second type does not match the one or more metadata of the second type, wherein the aggregating comprises:
performing a semantic interpretation of the metadata of the second type;
performing a semantic interpretation of the one or more metadata of the second type; and
generating a new metadata of the second type based on the semantic interpretations of the metadata of the second type and the one or more metadata of the second type.

10. The method of claim 9, further comprising:
storing transformation rules pertaining to cast information or crew information, wherein the transformation rules include:
a first rule that ignores certain parts of a name including a middle name, a middle initial, a prefix, and a suffix;
a second rule that reverses an order of a first name and a last name; and
a third rule that replaces a name that includes an accent with a corresponding name without the accent.

11. A device comprising:
a communication interface;
one or more memories, wherein the one or more memories store instructions; and
one or more processors, wherein the one or more processors execute the instructions to:
obtain metadata pertaining to programs originating from metadata sources;
compare metadata of a first type from one of the metadata sources with one or more metadata of the first type from one or more others of the metadata sources;
determine whether compared metadata of the first type from the one of the metadata sources matches the one or more metadata of the first type from the one or more others of the metadata sources based on a comparison;
transform the compared metadata based on one or more transformation rules when the compared metadata does not match;
store transformed metadata, wherein the transformed metadata of the first type from the one of the metadata sources matches at least one of the one or more metadata of the first type from at least one other of the metadata sources;
identify when metadata of a same metadata type is obtained from the one of the metadata sources and the at least one other of the metadata sources, wherein the metadata of the same metadata type is other than the first type;
determine which metadata of the same metadata type to aggregate based on a quality metric that indicates a quality of each metadata; and select metadata of the same metadata type from the one of the metadata sources or the at least one other of the metadata sources based on a determination of which metadata of the same metadata type to aggregate, wherein, when making the determination of which metadata of the same metadata type to aggregate based on the quality metric, the one or more processors further execute the instructions to:

count a number of words in the metadata of the same metadata type from the one of the metadata sources;

count a number of words in the metadata of the same metadata type from the at least one other of the metadata sources; and determine whether the number of words in the metadata of the same metadata type from the one of the metadata sources is greater than the number of words in the metadata of the same metadata type from the at least one other of the metadata sources, and wherein, when making a selection of metadata of the same metadata type, the one or more processors further execute the instructions to:

select the metadata of the same metadata type from the one of the metadata sources or from the at least one other of the metadata sources in response to a determination that the number of words in the metadata of the same metadata type from the one of the metadata sources or from the at least one other of the metadata sources is greater.

12. The device of claim 11, further comprising:
a storage, wherein the storage stores transformation rules, wherein the transformation rules includes functions that include expanding, removing, moving, splitting, and replacing at least one of one or more letters, one or more numbers, one or more roman numerals, or one or more words included in a type of metadata, and wherein when transforming the compared metadata, the one or more processors further execute the instructions to:
transform the compared metadata based on one or more of the functions.

13. The device of claim 11, wherein the one or more processors further execute the instructions to:
aggregate one or more other types of metadata, wherein an aggregation comprises:
identify a metadata type obtained from the one of the metadata sources that is not included in metadata obtained from the at least one other of the metadata sources;
identify another metadata type obtained from the at least one other of the metadata sources that is not included in metadata obtained from the one of the metadata sources; and
combine metadata of the metadata type with metadata of the other metadata type, wherein combined metadata includes aggregated metadata.

14. The device of claim 11,
wherein the metadata of the first type comprises a title of a program.

15. The device of claim 11, wherein the one or more processors further execute the instructions to:
identify when metadata of the same metadata type is obtained from the one of the metadata sources and the at least one other of the metadata sources, wherein the same metadata type is other than title metadata;
identify differences between metadata associated the same metadata type; and
generate metadata based on a combining of metadata associated with the same metadata type.

16. The device of claim 11, wherein the programs include movies and the first type of metadata includes titles of the movies, and the one or more processors further execute the instructions to:
aggregate other types of metadata associated with the compared metadata when the compared metadata match.

17. A device comprising:
a communication interface;
one or more memories, wherein the one or more memories store instructions; and
one or more processors, wherein the one or more processors execute the instructions to:
obtain, via the communication interface, metadata pertaining to programs originating from multiple metadata sources of multiple other devices;
compare title metadata associated with the programs;
determine whether title metadata match based on a comparison;
apply one or more transformation rules to title metadata when title metadata does not match with at least one other title metadata;
compare transformed title metadata to the at least one other title metadata;
store the transformed title metadata when the transformed title metadata matches the at least one other title metadata;
aggregate one or more other types of metadata associated with the transformed title metadata with one or more other types of metadata associated with the at least one other title metadata;
identify when metadata of a same metadata type is obtained from two or more metadata sources pertaining to a same or a similar program, wherein the metadata of the same metadata type is other than title metadata;
determine which metadata of the same metadata type to aggregate based on a quality metric that indicates a quality of each metadata, wherein, when making the determination of which metadata of the same metadata type to aggregate based on the quality metric, the one or more processors further execute the instructions to:
count a number of words in the metadata of the same metadata type from one of the two or more metadata sources;
count a number of words in the metadata of the same metadata type from at least one other of the two or more metadata sources; and
determine whether the number of words in the metadata of the same metadata type from the one of the two or more metadata sources is greater than the number of words in the metadata of the same metadata type from the at least one other of the two or more metadata sources, and wherein, when making a selection of metadata of the same metadata type, the one or more processors further execute the instructions to:
select metadata of the same metadata type from one of the two or more metadata sources based on a determination that the number of words in the metadata of the same metadata type from the one of the two or more metadata sources is greater than the number of words in the metadata from the at least one other of the two or more metadata sources.

18. The device of claim 17, further comprising:
a storage to store transformation rules, wherein the transformation rules include functions that include expanding, removing, moving, splitting, and replacing at least one a letter, a number, a roman numeral, or a word included in the title metadata, and wherein when applying the one or more transformation rules, the one or more processors further execute the instructions to:

transform the title metadata based on one or more of the functions.

19. The device of claim 17, further comprising:
a storage that stores a database of aggregated metadata.

20. The device of claim 17, wherein the one or more processors further execute the instructions to:
perform a semantic interpretation of metadata of a first field type from one of the two or more metadata sources;
perform a semantic interpretation of metadata of the first field type from one or more others of the two or more metadata sources; and
generate a new metadata of the first field type based on the semantic interpretations of the metadata of the first field type.

* * * * *